Nov. 22, 1938.  N. P. BILLING  2,137,378
PHOTOGRAPHIC CAMERA AND ATTACHMENTS THEREFOR
Filed July 29, 1936
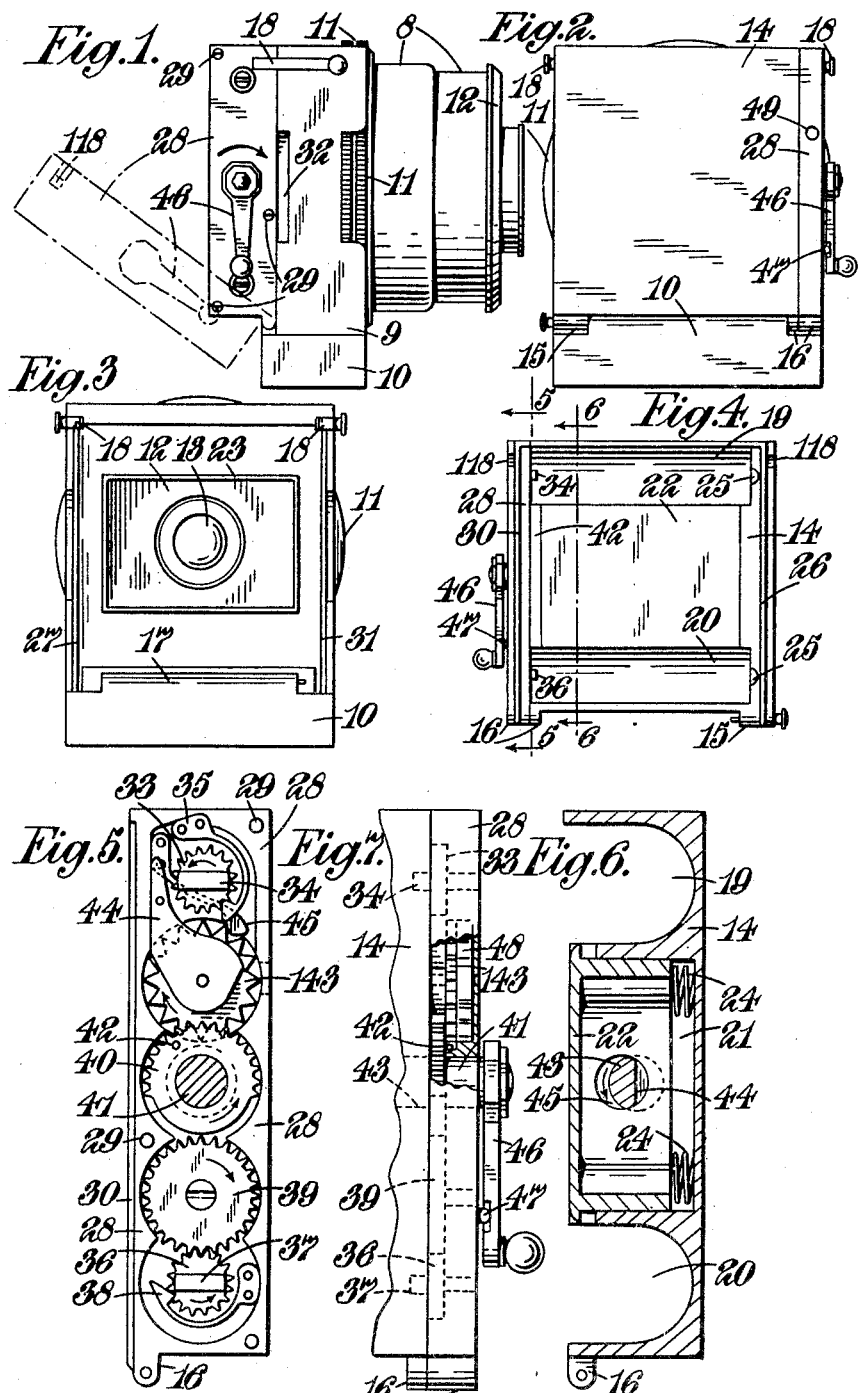

Patented Nov. 22, 1938

2,137,378

UNITED STATES PATENT OFFICE 2,137,378

PHOTOGRAPHIC CAMERA AND ATTACHMENTS THEREFOR

Noel Pemberton Billing, London, England

Application July 29, 1936, Serial No. 93,219
In Great Britain September 4, 1935

12 Claims. (Cl. 95—34)

This invention consists in improvements in or relating to photographic cameras and to attachments therefor, an attachment within the scope of the invention comprising a film carrier constructed for attachment to the body portion of a photographic camera and constructed also to accommodate a roll film.

Hitherto in cameras or film carrier attachments therefor adapted for use with roll films it has been necessary, in order to shift an exposed film area for the next in succession to be exposed, to turn the film winding spool by means of a knob or equivalent that is gripped between the thumb and fingers of the users. In cameras of small dimensions such a knob or equivalent proves troublesome to handle and as only a partial turn can generally be given to any one operation it requires several partial turns and hand movements to effect a complete film shift.

An object of the present invention is to overcome this drawback and the invention accordingly provides in or for a roll film camera other than a kinematograph camera, a film shifting device comprising in combination a rotatable spindle, a crank handle attached to the spindle, and means to provide a driving connection between the spindle and the film winding spool.

The invention also provides in or for a roll film camera a film shifting device comprising in combination a rotatable spindle, a handle or its equivalent attached to the spindle, means to provide a driving connection between the spindle and the film winding spool, and means to engage the spindle or a part secured or operatively coupled thereto and thereby locate the spindle in one or more positions of angular adjustment rotary movement between which positions corresponds with predetermined movements or shifts of the film.

In accordance with the invention also there is provided in or for a roll film camera, the combination of a presser member mounted to engage behind the film when the latter is in position for exposure, a film shifting device having a rotatable spindle, a handle or its equivalent attached to the spindle, means to provide a driving connection between the spindle and the film winding spool, and an operative connection between the spindle and the presser member such as to retract the latter immediately before a film shift is commenced and to permit a return movement of the presser member when the film shift is completed.

Preferably a film numbering device constituted by a member other than a film backing or the film itself is also provided in the combination constructed in accordance with the invention and a driving connection is then provided between the film numbering device and the rotatable spindle of the film shifting device.

In order that the invention may be more clearly understood a preferred constructional example will be described with reference to the accompanying drawing, in which:

Figure 1 is a side elevation of a preferred form of camera body with the film carrier attached thereto, Figure 2 is a rear view of the film carrier secured in position on the camera body, Figure 3 is a rear view of the camera body with the film carrier removed, Figure 4 is a front or internal view of the film carrier, Figure 5 is a section looking in the direction of the arrows on the line 5—5 of Figure 4, and drawn to an enlarged scale, Figure 6 is a section looking in the direction of the arrows on the line 6—6 of Figure 4, and drawn to the scale of Figure 5, and Figure 7 is a rear view partly in section of part of the film carrier.

Like reference numerals are employed to denote like parts in the various figures of the drawing.

The film carrier shown in the drawing is formed as a detachable back for a camera body of a construction now to be described. This camera body has telescopic elements 8 collapsible within a part 9 having the shape of a rectangular box and having secured to it a part 10 to accommodate auxiliary instruments for use in the camera such as view-finders and a range-finder. The camera body is also provided with a focussing ring 11 for effecting a bodily movement of the telescopic elements 8, and has a camera front 12 carrying the camera lens 13 seen in Figure 3. A very compact form of photographic camera is obtained with this construction and it is found desirable to provide means for ensuring an accurate movement of a film winding spindle of a film carrier provided in combination with such a camera body. It will be understood, however, that the invention is not limited in its application to a photographic camera of small dimensions and having the form shown in the drawing.

A main frame 14 of the film carrier is hinged at its lower part to the camera body to enable the film carrier to be moved to the position shown in chain lines in Figure 1 in order that the camera may be loaded with photographic material (i. e. roll film). The frame 14 is provided with dependent portions 15 and 16 which co-operate with cut-away parts of the upper edge 17 of the part 10 of the camera body to provide a hinged connection between the frame 14 and the part 10 of the camera body. A part 9 of the camera body is also provided with a pair of lever arms 18 for the purpose of co-operating with the recess 118 for securing the film carrier or camera back in the closed position.

Spaced apart in the main frame 14 are recesses 19 and 20 which serve to accommodate a pair of film spools between which the film is extended when the camera is in use. Between the recesses 19 and 20 is a further recess 21 of rectangular shape serving to accommodate a U-shaped presser member 22, the outer surface of the base of which U-shaped presser member is intended to engage behind the film and press the forward surface of the film into close contact with the raised edge 23 surrounding the aperture in the rear wall of the part 9 of the camera body through which the film is to be exposed to light passing through the camera lens 13. The presser member 22 is subject to the action of the springs 24 located between the member 22 and the main frame 14 of the film carrier. The presser member 22 is retained in position against the action of the springs 24 in a manner which will be described hereinafter. As will be apparent from the above, film passing from a film spool located in the recess 19 passes in contact with the outer surface of the base of the U-shaped presser member 22 to the film spool located in the recess 20.

The main frame 14 is provided at one end of the recesses 19 and 20 with grooves 25 extending from front to rear of the main frame 14 which is in the general form of a cover to be applied to the camera back. The grooves 25 serve to accommodate projections at one end of each film spool to centre the latter correctly in the recess 19 or 20. The grooves 25 are provided in a side wall of the frame 14 which also carries at its forward face a V-sectioned projecting ridge 26 to co-operate with a ridge 27 shown in Figure 3. The opposite side of the frame 14 is closed by a separate cover plate 28 secured to the frame 14 by the screws 29 and serving to accommodate the mechanism described hereinafter. The forward edge of the cover 28 is provided with a V-sectioned ridge 30 to co-operate with the ridge 31 shown in Figure 3 and carried by the rear wall of part 9 of the camera body. The co-operating ridges 26 and 27 and 30 and 31 serve to prevent the entry of light in a lateral direction at the junction of the camera body and the film carrier. A recess 32 is formed in the side wall of the camera body to facilitate withdrawal of the film carrier to the position shown in chain lines in Figure 1.

Pivotally mounted on the inner side of the cover 28 at the upper end thereof is a ratchet wheel 33 having a projecting strip 34 extending diametrically of the ratchet wheel for the purpose of engaging a corresponding recess in one end of a film spool. The film spool will be loaded into the recess 19 when the ratchet 33 is in the position shown in Figures 4 and 5 so that it is possible for the film to be pressed home with the aforesaid recess and the projection 34 in co-operating engagement. A ratchet 35 is also secured on the inner side of the cover 38 to co-operate with the ratchet wheel 33. At the lower end of the cover 28 is pivotally mounted a spur or gear wheel 36 provided with a projection 37 similar to the projection 34 and also normally occupying the position shown in Figures 4 and 5 when film is to be loaded into the camera. A ratchet 38 is also secured to the cover 28 to co-operate with the spur wheel 36. A further wheel 39 is pivotally mounted on the cover 28 to mesh with the wheel 26 and to be subjected to operation under the action of a mutilated gear wheel 40 carried on a spindle 41 having bearings in upstanding portions or side walls of the frame 14 at opposite sides of the recess 21. One such side wall 42 seen in Figure 4 is cut-away to conform in shape to the recesses 19 and 20. The central portion of the spindle 41 located between the side walls bounding the recess 21 is formed as a cam 43 seen in Figure 6 rotatable about an axis 44 and passing through circular holes 45 in end walls or flanges of the presser member 22. It will be appreciated therefore that on rotation of the cam 43 about the axis 44 the opening 45 is caused to move from the position shown in full lines in Figure 6 to the position shown in chain lines and then back again to the position shown in full lines. This movement corresponds to a movement of withdrawal of the presser member 22 from the rear of the film and a reapplication of the member 22 to the film under pressure of the springs 24. By way of explanation it is to be noted that Figure 6 is a section on the line 6—6 of the frame 14 and associated parts with the cover 28 and parts carried thereby removed from the frame 14.

The mutilated gear 40 mounted on the spindle 41 carries also on its rear surface as seen in Figure 5 a projection 42 to engage with a star wheel 143 pivotally carried by the frame 28 and secured in place by a small cover plate 44. The wheel 143 is also subject to the action of a spring detent 45. The spindle 41 is provided with an extension passed through the cover 28, and secured to the free end of the spindle 41 is a crank handle 46. Between the crank handle 46 and the cover 28 is a spring click device 47 for the purpose of locating the handle 46 in the normal position seen most clearly in Figure 1. All of the gear wheels pivotally mounted on the cover 28 and the mutilated gear wheel 40 carried by the spindle 41 are located in recesses suitably cut on the inner surface of the cover member 28. The wheel 143 also carries a narrow drum 48 a part of the periphery of which is visible through a small opening 49 in the cover 28 as will be seen from Figure 2. The drum 48 is provided with a series of numerals and suitable warning indications referred to hereinafter.

In the use of the film carrier which has been described film spools are inserted into the recesses 19 and 20 when the film carrier is in the position shown in chain lines in Figure 1 and when the mechanism carried by the cover member 28 is in the position shown in Figure 5. The free end of the film or film backing is passed to the film spool in the recess 20 and secured thereto in the usual manner. Rotation of the crank handle 46 after the film carrier has been moved to the closed position brings a series of three warning marks to the position of the original blank space on the periphery of the drum 48 showing through the hole 49. The free end portion of the film roll is being taken up on the film winding spool during this process and after a series of warning devices have been shown a series of film numbers corresponding to the successive exposure areas in the film are indicated through the aperture 49. When the exposure areas have all been utilized a further series of warning indications are shown through the aperture 49 and when the original blank space reappears all parts of the mechanism provided in the film carrier have returned to the position shown in the drawing and the film winding spool located in the recess 20 may be withdrawn for development, and the empty spool from the recess 19 transferred to the recess 20 for use with the next roll film to be exposed in the camera.

The gearing between the spindle 41 carrying the crank handle 46 and the film winding spindle is conveniently arranged to have a ratio such that one complete rotation of the handle 46 moves the film the required amount for substituting one picture space or exposure area by the next successive exposure area along the length of the film. It will be appreciated that as the film is wound on the film winding spool rather more film is wound on to the spool at each successive revolution owing to the increase in diameter and the picture spaces will accordingly have successively increasing distances between them along the length of the film. This feature is immaterial to the successful operation of the camera, however, more especially in view of the fact that the actual distance or interval between successive exposure area is in any case very small. It is not essential for the mechanism to be arranged so that one complete revolution of the spindle 41 effects the desired movement of the film since any other predetermined angular movement of the spindle 41 necessary to move the film may be effected as required by hand.

It will be appreciated that the spring click device 47 affords means to locate the film winding mechanism in successive positions corresponding to the location of successive exposure areas of the film in position for exposure in the camera.

Movement of the crank handle 46 in a clockwise direction as seen in Figure 1 effects the rotation of the spindle 41 in an anti-clockwise direction as seen in Figure 5. From a consideration of Figure 6 it will be understood that rotation of the cam 43 about its centre 44 causes an immediate retraction of the presser member 22 during a movement of some 60° and the cam 43 is so shaped that the presser 22 is held in this retracted position until a similar and equal phase displacement at the end of the movement of revolution of the spindle 41. Owing to the mutilated form of the gear wheel 40 the initial movement of retraction of the presser 22 is unaccompanied by any other operation and it is only after the presser 22 has been retracted from contact with the rear surface of the film that the mutilated gear 40 engages the gear wheel 39 to produce the rotation of the film winding spool located in the recess 20 by virtue of its engagement with the projection 37 on the wheel 36. Accordingly a winding or shifting movement of the film in the camera only takes place during a period at which the film presser 22 is held in a retracted position by virtue of the action of the cam 43. The teeth of the mutilated gear 40 will again move out of engagement with the wheel 39 before the end of a complete revolution of the spindle 41 and before a return movement of the presser member 22 is allowed to take place. At the end of the movement of revolution of the spindle 41 the projection 42 of the mutilated gear 40 engages the star wheel 143 to move the latter by one tooth so that the indication given to the aperture 49 by the markings on the periphery of the drum 48 is suitably changed. It will be seen that the pin 42 on the mutilated gear 40 and the star wheel 143 constitute the approximate equivalent of a Geneva stop mechanism.

The gears which have been described are so arranged that the projection 37 on the wheel 36 which is in the position shown in Figure 5 during loading of the film returns to this position after a suitable number of revolutions of the spindle 41 have been effected for transferring completely the film from the spool in the recess 19 to the winding spool in the recess 20. The number of teeth on the star wheel 143 and the number of indications carried by the periphery of the drum 48 for exposure through the aperture 49 are also arranged to correspond to the required number of revolutions in the spindle 41 for the complete transference of the film from one spool to another.

Modification of the mechanism which has been described may be effected for example by the provision of a small bevel gear on the spindle 41 to mesh with a bevel gear wheel pivotally mounted on the rear surface of the frame 14. Such a wheel would be provided with a milled edge or a projection by means of which it may conveniently be turned. The wheel will also be provided in combination with a series of spring click devices serving as means to locate the bevel gear in suitable positions of adjustment at which in each case a necessary and desirable shift of the film within the camera has been effected.

I claim:—

1. A roll film camera back comprising in combination a closure member for application to the rear of a camera body, and movably mounted in said closure member, a presser member to engage behind that part of the film in position for exposure, a film shifting device having a manually operable rotatable spindle and a film spool winding element, an automatically engageable and disengageable driving connection between the spindle and the spool winding element, and an operative connection between the spindle and the presser member including a cam shaped to retract the presser member from engagement behind the film immediately before a film shift is commenced by engagement of the aforesaid driving connection and subsequently to permit a return movement of the presser member when the film shift is completed and the aforesaid driving connection disengaged.

2. A roll film camera back according to claim 1 comprising also a film-numbering device constituted by a member separate from the film backing and the film itself, and an operative connection between the numbering device and the rotatable spindle of the film shifting device.

3. A roll film camera back according to claim 1 comprising means to engage a part in operative connection with the rotatable spindle thereby to locate the latter in one of a series of positions of rotary adjustment such that movement between successive positions of adjustment corresponds with predetermined movements or shifts of the film, a film-numbering device constituted by a member separate from the film backing and the film itself, and an operative connection between the numbering device and the rotatable spindle such as intermittently to actuate the numbering device when the spindle is moved between successive positions of rotary adjustment as aforesaid.

4. A roll film camera back according to claim 1 comprising means to engage a part in operative connection with the rotatable spindle thereby to locate the latter in a position of rotary adjustment such that movements of equal angular displacements of one revolution between successive positions of adjustment correspond with predetermined movements or shifts of the film, a film-numbering device constituted by a member separate from the film backing and the film itself, and an operative connection between the numbering device and the rotatable spindle such as intermittently to actuate the numbering device during the successive complete movements of rotation of the spindle.

5. A roll film camera back according to claim 1 comprising means to engage a part in operative connection with the rotatable spindle thereby to locate the latter in a position of rotary adjustment such that movements of equal angular displacements of one revolution between said position of adjustment correspond with predetermined movements or shifts of the film, a film-numbering device constituted by a member separate from the film backing and the film itself, and an operative connection between the numbering device and the rotatable spindle of the film shifting device afforded by a mechanism for producing a step by step movement of the film numbering device at successive revolutions of the spindle.

6. A roll film camera back according to claim 1 comprising a crank handle secured to the rotatable spindle of the film shifting device, a spring click device located between the crank handle and the camera back to locate the rotatable spindle in a desired position of angular adjustment with the crank handle in compact alignment with the camera back so that equal angular displacements of one revolution of the spindle between said position of adjustment correspond with predetermined movements or shifts of the film, a film-numbering device constituted by a member separate from the film backing and the film itself, and an operative connection between the numbering device and the rotatable spindle such as intermittently to actuate the numbering device during the successively complete movements of rotation of the spindle.

7. A roll film camera back according to claim 1 in which the means to provide a driving connection between the rotatable spindle of the film shifting device and the film spool winding element are such that successive complete rotations of the spindle effect the desired movement or shift of the film and are such as to provide the said driving connection only during part of each rotation of the aforesaid spindle.

8. A roll film camera back according to claim 1 in which the means to provide a driving connection between the rotatable spindle of the film shifting device and the film spool winding element are such that successive complete rotations of the spindle effect the desired movement or shift of the film, and are such also as to include a multilated gear element secured to the rotatable spindle to mesh with a complete gear element coupled to the film spool winding element only during part of each rotation of the aforesaid spindle.

9. A roll film camera back according to claim 1 in which the operative connection between the rotatable spindle of the film shifting device and the presser member comprises a cam portion of the spindle passing through and in engagement with apertures provided in flanges at the sides of the presser member.

10. A roll film camera back according to claim 1 in which the operative connection between the rotatable spindle of the film shifting device and the presser member comprises a cam portion of the spindle passing through and in engagement with apertures provided in flanges at the sides of the presser, which cam and apertures are shaped to effect a retraction of the presser member during an initial small rotary movement of the spindle, to maintain the presser member in a retracted position for the major part of a rotation of the spindle and to permit a return movement of the presser member during a small rotary movement of the spindle at the end of a complete rotation thereof.

11. A roll film camera back according to claim 1 in which the operative connection between the rotatable spindle of the film shifting device and the presser member comprises a cam portion of the spindle passing through and in engagement with apertures provided in flanges at the sides of the presser, which cam and apertures are shaped to effect a retraction of the presser member during an initial small rotary movement of the spindle, to maintain the presser member in a retracted position for the major part of a rotation of the spindle and to permit a return movement of the presser member during a small rotary movement of the spindle at the end of a complete rotation thereof, and in which the means to provide a driving connection between the rotatable spindle of the film shifting device and a film spool winding element are such that successive complete rotations of the spindle effect the desired movement or shift of the film and are also such as to provide the said driving connection only during that part of each rotation of the spindle during which the presser member is maintained in the retracted position.

12. A roll film camera back comprising in combination a closure member for application to the rear of a camera body, a presser member movably mounted in the closure member to engage behind that part of the film in position for exposure, flanges at opposed sides of the presser member, a manually operable rotatable spindle of a film shifting device, a cam portion of the spindle passing through apertures in the flanges of the presser member, a multilated gear secured to the spindle, an end cover for the closure member, and mounted on the inner side of the end cover a gear wheel to mesh with the multilated gear, a film spool winding element, a driving connection between the latter and the gear wheel, a film numbering device and an operative connection between said device and the rotatable spindle, the aforesaid cam portion of which spindle is shaped to effect on rotation of the spindle retraction of the presser member from engagement behind the film immediately before a film shift is commenced by engagement of the mutilated gear with the gear wheel and subsequently to permit a return movement of the presser member when the film shift is completed and the multilated gear and gear wheel disengaged.

NOEL PEMBERTON BILLING.